US008982211B2

(12) United States Patent
Chinigo

(10) Patent No.: US 8,982,211 B2

(45) **Date of Patent: *Mar. 17, 2015**

(54) SECURITY SYSTEM FOR MASS TRANSIT AND MASS TRANSPORTATION

(76) Inventor: Andrew Chinigo, New York, NY (US)

( * ) Notice: Subject to any disclaimer, the term of this patent is extended or adjusted under 35 U.S.C. 154(b) by 991 days.

This patent is subject to a terminal disclaimer.

(21) Appl. No.: 13/017,480

(22) Filed: Jan. 31, 2011

(65) Prior Publication Data

US 2011/0163896 A1 Jul. 7, 2011

Related U.S. Application Data

(63) Continuation of application No. 11/208,634, filed on Aug. 22, 2005, now Pat. No. 7,880,767.

(51) Int. Cl.

| | |
|---|---|
| ***H04N 7/18*** | (2006.01) |
| ***G06F 19/00*** | (2011.01) |
| ***H04K 3/00*** | (2006.01) |
| ***G07C 5/08*** | (2006.01) |
| ***G07C 9/00*** | (2006.01) |
| ***G08B 13/196*** | (2006.01) |

(Continued)

(52) U.S. Cl.

CPC *H04K 3/41* (2013.01); *G07C 5/085* (2013.01); *G07C 5/0891* (2013.01);

(Continued)

(58) Field of Classification Search

USPC ......... 348/148; 701/120, 9, 117, 35; 340/539, 340/22, 521; 705/5

See application file for complete search history.

(56) References Cited

U.S. PATENT DOCUMENTS 6,119,096 A * 9/2000 Mann et al. ....................... 705/5
6,545,601 B1 4/2003 Monroe (Continued)

FOREIGN PATENT DOCUMENTS

DE 4112934 A1 10/1992

OTHER PUBLICATIONS

International Search Report published on Dec. 13, 2007 for PCT/US06/32328 filed Aug. 18, 2006.

(Continued)

*Primary Examiner* — Gims Philippe

(74) *Attorney, Agent, or Firm* — Fleit Gibbons Gutman Bongini & Bianco PL; Martin Fleit; Paul D. Bianco

(57) ABSTRACT

A security system and method for mass transit and mass transportation whereby high capacity mobile vehicles such as ships, buses, planes, trains and subways transporting large numbers of passengers or cargo, are continuously monitored and secured. Sensors are utilized to detect and alert the presence of radioactive or explosive materials on board as well as within close proximity of the vehicle. Sensors are also used to identify and track cargo and people, such as drivers, operators, employees, crew, and passengers, and provide continuous location and tracking thereof from the point of initial entry to the final point of exit. Additionally, a global positioning system (GPS) provides location data, and wireless data and telecommunications link provides two-way data and voice communication with any designated remote location by using one of several modes of wireless telecommunication. Cameras provide visual observation within designated viewable areas, and may be activated by any detection of motion, and are infrared or night vision capable allowing viewing even in extremely poor light conditions. DVR recording allow a huge amount of video content from the cameras to be digitally recorded, then played back later for further analysis. Finally, the Security System may optionally have an Internet Protocol (IP) address thereby allowing authorized persons to access the system from secured Internet connection.

26 Claims, 12 Drawing Sheets

(51) Int. Cl.
*G08B 17/00* (2006.01)
*G08B 21/22* (2006.01)
*G08B 31/00* (2006.01)

(52) U.S. Cl.
CPC ....... *G07C 9/00087* (2013.01); *G07C 9/00111* (2013.01); *G08B 13/19647* (2013.01); *G08B 13/19697* (2013.01); *G08B 17/00* (2013.01); *G08B 21/22* (2013.01); *G08B 31/00* (2013.01); *H04K 3/226* (2013.01); *H04K 3/28* (2013.01); *H04K 3/45* (2013.01); *H04K 2203/16* (2013.01); *H04K 2203/22* (2013.01); *H04K 2203/24* (2013.01)
USPC ........................................... 348/148; 701/120

(56) References Cited

U.S. PATENT DOCUMENTS

| | | | | |
|---|---|---|---|---|
| 7,173,526 | B1 | 2/2007 | Monroe | |
| 7,302,323 | B2 | 11/2007 | Anderson et al. | |
| 7,768,548 | B2 * | 8/2010 | Silvernail et al. | 348/148 |
| 7,880,767 | B2 | 2/2011 | Chinigo | |
| 2003/0139959 | A1 | 7/2003 | Sabouni | |
| 2003/0169335 | A1 | 9/2003 | Monroe | |
| 2004/0117638 | A1 | 6/2004 | Monroe | |
| 2004/0140924 | A1 | 7/2004 | Keller et al. | |
| 2004/0143737 | A1 | 7/2004 | Teicher | |
| 2005/0065711 | A1 | 3/2005 | Dahlgren et al. | |
| 2007/0040672 | A1 | 2/2007 | Chinigo | |
| 2012/0249326 | A1 * | 10/2012 | Mostov | 340/539.17 |

OTHER PUBLICATIONS

International Preliminary Report on Patentability published on Feb. 26, 2008 for PCT/US06/32328, filed Aug. 18, 2006.

Written Opinion of the International Searching Authority published on Feb. 22, 2008 for PCT/US06/32328, filed Aug. 18, 2006.

Supplementary European Search Report dated Sep. 28, 2009, for PCT/US2006/032328, filed Aug. 18, 2006.

* cited by examiner

SECURITY SYSTEM FOR MASS TRANSIT AND MASS TRANSPORTATION

CROSS REFERENCE TO RELATED APPLICATION

This application is a continuation of U.S. patent application Ser. No. 11/208,634, filed Aug. 22, 2005, the entire contents of which are incorporated herein by reference.

BACKGROUND OF THE INVENTION

1. Field of Invention

The present invention relates to a security system for mass transit and mass transportation.

2. Prior Art

The security of passengers or cargo utilizing various forms of mass transit has increasingly become of great concern worldwide. The fact that many high capacity passenger and/or cargo mass transit vehicles or mass transporters, such as, ships, subways, trains, trucks, buses, and aircraft, have been found to be "soft targets" have therefore increasingly become the targets of hostile or terrorist attacks, and this is particularly troubling to a world striving to protect and maintain peace. The problem is further exacerbated whereby there are such diverse methods of mass transit within even more diverse environments, therefore a very comprehensive but unified solution is required. For example, attempts to screen cargo and passengers prior to boarding have improved safety and security somewhat, but these solutions have been few, and are non-cohesive and more passive than active. To this extent, there has not been an active, truly viable solution that can effectively and continuously monitor and report passenger, cargo and on board status information for the duration of the vehicle in transit, and in response to adverse conditions reported, actively begin the mitigation process by immediately alerting on board crew in addition to the appropriate first responders. Whereas there have been certain individual developments proposed in the prior art regarding different individual aspects of the overall problem, no one has as yet developed an active, comprehensive, fully integrated system to deal with the entire range of issues and requirements involved within the security and diversity of mass transit. In particular, a system such as the present invention that would most likely provide the necessary early detection, and potentially aid in the prevention of catastrophic events.

SUMMARY OF THE INVENTION

The system is an active, intelligent, integrated system to provide unprecedented security including data reporting never before afforded the many millions utilizing mass transit. In particular, the goal of the system is to provide very high levels of monitoring and early detection of adverse conditions, and of hostile or terrorist acts upon mass transit vehicles. In order to accomplish this goal, one must create a mobile environment that is not only more secure but also continuously and actively monitored as such. The ultimate goal is to have a "homeland security" technology whereby all of the differing methods of mass transit, such as bus, ship, train, aircraft, etc. all have a unified commonality, and (parts thereof) can all be monitored unilaterally, perhaps by a single entity or agency. Unprecedented passenger or cargo safety, and security are obtained.

Process of and key functionalities;

I.R. Cameras and Motion Activation

Infrared or "night vision" cameras are placed at pre-determined locations within the vehicle, such as doorways, cargo hold, engine compartment, operators station i.e. cockpit/bridge/dashboard etc. These IR cameras allow viewing in dark or poor light conditions. They are both manually operated by an input signal into the system from a touch screen display, or keypad, commanding the cameras maintain "always on" status, or by default, the cameras are on "stand by" and become active upon an input signal. This input signal is sent by the processor, or perhaps by a direct connection from a motion sensor also located in the same field of view as the respective camera. Defaults are set up so that "system status" conditions set predetermined settings of expected activity or inactivity whereby if the vehicle is docked and no person is expected to be in the engine compartment, a signal from the motion sensor seta off an alarm in addition to activating the respective camera(s). DVR recording allows the recording and playback of huge amounts of video content. This will prove especially helpful in after the fact evaluation of employees, passengers, events or occurrences, and accidents.

Identification and Tracking of Persons & Cargo;

Biometric detection devices such as retinal or fingerprint scan, as well as the use of RFID sensor technology, provide accurate identification of passengers and cargo. Each time this occurs the processor is utilizing this information to create and build a "manifest" of cargo inventory as well as a manifest of humans on board (incl. employee's, passengers, etc) The processor creates and individualizes these manifest categorically i.e. humans/cargo/misc. The system then uses this information to; record to the dedicated internal memory block; display to the display(s) on board; report via telecommunications link in response to a predetermined alarm command therein. Additionally, RFID or "smart card" sensors are place at predetermined points throughout the vehicle such that any predetermined person or cargo item with RFID tag on or about them, can be continuously tracked and monitored (such as "there are 3 people in the engine room, this guy that guy etc") or ("Mr. Jones is not on board however his cargo or luggage is", and vice versa) or ("there are these 23 people in the casino, these 38 people in the lounge, these 45 people on the bus") this may be utilized to track and monitor employees only, cargo only, passengers, or any combination thereof. In addition, biometric sensors are place at predetermined points on the vehicle in order to insure the highest possible accuracy of identification of persons passing those points.

Bomb and Bio-Hazard Detection and Reporting;

Active at all times, the system utilizes sensors placed on or within the vehicle such that the interior and close outer proximity of the vehicle is in detectable range of radio isotopes, explosive, and bio-hazardous materials. This system shall utilize currently available technology that best suits the needs of the system. Being an "always on" sensory portion of the system, at any time of detection of said material an alarm is created and via an output signal, the processor is signaled accordingly. An alarm is created thereof, and the processor responds by: visual and audio warning thru display(s) and audio within the vehicle including the location of the threat, plus activation of cameras in the vicinity of the detection and display thereof to the display(s) on board, plus shut down all cellular wireless communication links within the system, plus output of signal to "cellular jamming device" on board the vehicle thereby activating a jamming of any cellular signals in the areas within and surrounding the vehicle, plus initiating an outbound emergency communication utilizing the systems "satellite communication" unit, thereby allowing the system to communicate with remote location regardless of the cellular jamming occurring. A manual operator input signal to bypass the cellular jamming is also in place in case of false alarm or etc.

Gps/Vehicle Location

At all times the vehicle is aware of its current location via the GPS module and antenna on board. Any allowed remote access may enter thru the communications transceiver and obtain the status of the system in addition to the location of the vehicle. Additionally, the system may be able to constantly report its location via the transceiver or satellite communication link.

Communications Links

The system utilizes 3 differing modes of communication in order to send and receive data and voice information to/from any allowed predetermined remote location. The modes shall be, and in order of preferred order; FIRST, a dedicated private communication network, such as a dedicated short range communication (DSRC) network, WiMax, or any other such known technology better suited for this application whereby the vehicle is linked to other predetermined network vehicles, regardless if the vehicle (such as sister ships or other fleet vehicles) is a node on such network or not, but preferably, directly to remote station, or if not so available, through a relay station; SECOND, a typical cellular wireless connection (i.e. Verizon, Cingular, Nextel); THIRD, satellite communication whereby any data and voice communication will take place in the case of unavailable signal in the prior two methods, or in the presence of an alarm condition from the bomb sensors wherein the SECOND method will be disabled and a jamming device of these frequencies also activated.

Expansion I/O Port

This extra port connected to the processor will allow the system the flexibility for future upgrades, or to allow remote location access in order to output signals into the processor and activate alarms, trigger certain sensors or functions of the vehicle and/or system that are also connected to the system. In essence, also help prevent obsolescence by providing such expandability and upgradability.

Passenger Seat Restraint Monitoring And Reporting

This function will enable the vehicle operator, designated crew members, and any predetermined remote location access to who is sitting where, and indicate if they buckled in. The increased functionality comes in where RFID works in conjunction so that ("Mr. Jones is sitting in his assigned seat 11, and is NOT buckled in") or ("someone WAS sitting in seat 27, and has unbuckled AND left the seat"). This may additionally provide valuable information whereby any potential onboard threats may be identified early, or perhaps otherwise thwarted.

Memory Blocks

One or more memory blocks within the system record events, alarms, passenger and cargo manifest, and various predetermined data collated from within the system. Additionally, the memory shall record data and information received from remote location via the telecommunications link, such as software update, passenger manifest, cargo manifest, itinerary map info, etc. The memory is such that the processor may retrieve the data and information contained in the memory at a later time as needed. There may be partitions or separate blocks of memory such that internal events and alarms are separate from external recorded memory such as the itinerary.

Displays

As displays, particularly within the vehicle, the preferred application will be a touch screen color panel, or a portable tablet, thereby allowing a viewing of multiple screens layered in a predetermined fashion, and also allowing interactive input of the user to a certain degree of functionality (example; Vehicle operator touches screen to review the passenger manifest, then touches screen to change over to the cameras, then touches screen to download itinerary or manifests from remote location etc.)

Traffic Hazard Warning

The Traffic Hazard Warning feature alerts the operator and the Central Station (if simultaneously also monitoring said vehicle) of certain impending traffic hazards in the path of the moving vehicle. For example, a bus is moving on path to a railroad crossing. The Traffic Hazard Warning feature looks for a predetermined output signal either from the train or from the RR crossing station, and in response, audio AND visual warnings are activated to alert the driver of an oncoming train, or of the potentially unsafe conditions ahead. This may be achieved by either downloaded data indicating a railroad crossing on the forward path, or, by a wireless signal received from the RR crossing broadcasted within a predetermined perimeter zone of it's location. Similarly, a major intersection may be outfitted with a limited range communication technology, and the Traffic Hazard Warning feature being capable of receiving a predetermined signal, can alert the driver and thereby cause the initiation of the appropriate steps of mitigation to help avoid disaster.

It is accordingly, the principal object of the present invention to provide a security system for mass transit and mass transportation that actively operates taking into account the entire range of issues involved. This is accomplished by the present invention, by providing a vehicle, vessel, or craft with a host of sensors utilizing state-of-the-art technology so that implementation is readily effected without any substantial redesign of the basic structure of the vehicle, and without requiring any significant modification of its structure. In addition, being an "always on" system, the inner and outer proximity environments are constantly monitored on-board as well as to any designated remote location, utilizing triple redundant wireless data and communications technologies.

Further objects of the present invention include the following.

A security system for mass transit and mass transportation, whereby a substantial number of passengers and/or cargo items are transported by an inter-modal transportation vehicle, such as a bus, ship, train, subway, or aircraft, and comprising:

a) a vehicle that transports substantial cargo and/or passengers, including a plurality of seats for crew and/or passengers, and a cargo hold whereby cargo is stored for transit, and said vehicle having at least one seat for a driver, pilot or operator, and said vehicle having at least one door or entry point through which people and/or cargo enter and exit;

b) a first sensor and associated at each doorway and other predetermined points within the vehicle for sensing and outputting a first signal regarding the identity and presence of any identification media passing within detectable proximity of said first sensor;

c) a second sensor mounted on the vehicle for sensing and outputting a second signal indicative of explosive material located in the interior of the vehicle or in close outer proximity to the vehicle;

d) a third sensor associated with each designated operator and passenger seat, for sensing and outputting a third signal indicative of a person occupying the associated seat;

e) a fourth sensor associated with each seat belt associated with each seat for sensing and outputting a fourth signal indicative of a person seated in the associated seat and buckled in;

f) an alarm actuated responsive to a predetermined signal;

g) a display located within the vision of the vehicle operator for displaying collected data and information specifically correlated with the respective occupancy of seats and other conditions about the vehicle, and said display comprised of one or more selectable screens available to an operator with manual control by the operator of input and screen selection;

h) means for indicating and displaying the identification and presence and location of each cargo item or person in the vehicle in response to the first signals received, and for comparing to any preloaded manifest in memory for generating a first difference signal;

i) means for indicating and displaying all designated seating positions within the vehicle including information regarding the status of occupancy and seat belt use in accordance with the third and fourth signals;

j) means for indicating and displaying any alarm within the system;

k) a computer system for controlling the security system including an I/O for generating an input signal by a driver, operator, or authorized person, a memory and a processor to receive the signals and to initiate an alarm responsive thereto, said memory being enabled to store collected and collated data concerning the signals, the status of sensors and the status of the display, data including manifests and itinerary downloads;

l) three modes of communication including i) a wireless dedicated communication network, ii) a conventional cellular wireless protocol, and iii) a satellite transceiver for satellite based communication outside modes i) and ii);

m) a cellular wireless jamming device responsive to a signal generated by the processor;

n) means for inputting information into the memory via the processor from hard-wired and wireless sources;

o) whereby said processor is enabled to compare the identification of cargo or persons within the vehicle as received from the first sensor to relevant data stored into memory with information such as a passenger or cargo manifest, and to identify expected, permitted, or disallowed passengers or cargo, and responsive to a mismatch, initiate the predetermined signal to activate the appropriate alarm, and additionally, enables selection of differing methods of communication, and responsive to a predetermined alarm signal initiated from a sensor, to select or de-select a mode of communication to a remote location, and, in addition to the activate the cellular wireless jamming device.

A security system for mass transit and mass transportation, according to the above further including a motion sensor for providing an output signal indicating motion within or about the vehicle and infrared or night vision cameras coupled to the processor operable and responsive to an output signal from a motion sensor for visually monitoring an area being sensed by the motion sensor, even in low light conditions, and providing an output.

A security system for mass transit and mass transportation, according to the above wherein the display is coupled via the processor to visually area(s) being covered by the cameras.

A security system for mass transit and mass transportation, according to the above wherein a camera is triggered in response to the output of a second signal indicative of explosives or bio-hazards detected in the interior of the vehicle or in close outer proximity, and the camera is directed to view the area where the detection has occurred.

A security system for mass transit and mass transportation, according to the above wherein, the display will display a visual warning(s) responsive of the camera view and predetermined information related thereto.

A security system for mass transit and mass transportation, according to the above wherein the memory is enabled for storing downloaded itinerary data for future retrieval.

A security system for mass transit and mass transportation, according to the above whereupon the alarm will be triggered responsive to the first or third signal, and the processor will immediately initiate a report of the alarm to be displayed on the display and additionally to be transmitted via the wireless data and communications link to a predetermined remote location.

A security system for mass transit and mass transportation, according to the above further including a manual controllable means, operable by the operator or driver while normally operating the vehicle, for initiating the wireless data and communication link between the vehicle and a remote location and sending a message.

A security system for mass transit and mass transportation, according to the above further including a global positioning means coupled to the wireless data and communication link for providing location data to a predetermined remote location.

A security system for mass transit and mass transportation, according to the above further including telematic means for sensing the motion, direction and speed of the vehicle.

A security system for mass transit and mass transportation, according to the above wherein the DVR digitally records video content and the memory memorializes alarms and events sensed, both for future retrieval.

A security system for mass transit and mass transportation, according to the above further including digital cameras for viewing the interior and exterior, and sending signals via wireless data and communications link to a remote location.

A security system for mass transit and mass transportation, according to the above further including means for conducting a self-test program controlled by the processor for checking the sensors, displays, and cameras.

A method for ensuring the security of mass transit and mass transportation, whereby a substantial number of passengers and/or cargo items are transported by an inter-modal transportation vehicle, such as a bus, ship, train, subway, or aircraft, and comprising the steps of:

a) providing a vehicle that transports substantial cargo and/or passengers, including a plurality of seats for crew and/or passengers, and a cargo hold whereby cargo is stored for transit, and said vehicle having at least one seat for a driver, pilot or operator, and said vehicle having at least one door or entry point through which people and/or cargo enter and exit;

b) sensing doorways and other predetermined points within the vehicle for outputting a first signal regarding the identity and presence of any identification media passing within detectable proximity of said first sensor;

c) sensing and outputting a second signal indicative of explosive material located in the interior of the vehicle or in close outer proximity to the vehicle;

d) sensing and outputting a third signal indicative of a person occupying a seat;

e) sensing and outputting a fourth signal indicative of a person seated in a seat and buckled in;

f) actuating an alarm responsive to a predetermined signal;

g) displaying within the vision of the vehicle operator one or more selectable screens available to the operator collected data and information specifically correlated with the respective occupancy of seats and other conditions about the vehicle, h) providing the operator with manual control of input and screen selection;

i) indicating and displaying the identification and presence and location of each cargo item or person in the vehicle in response to the first signals received, and comparing to any preloaded manifest in memory for generating a first difference signal;

j) indicating and displaying all designated seating positions within the vehicle including information regarding the status of occupancy and seat belt use in accordance with the third and fourth signals;

k) indicating and displaying any alarm within the system;

l) controlling the security by a computer system including an I/O for generating an input signal by a driver, operator, or authorized person, a memory and a processor to receive the signals and to initiate an alarm responsive thereto, said memory being enabled to store collected and collated data concerning the signals, the status of sensors and the status of the display, data including manifests and itinerary downloads;

m) providing three modes of telecommunication including i) a wireless dedicated short range communication network, ii) a conventional cellular wireless protocol, and iii) a satellite transceiver for satellite based telecommunication outside modes I) and ii);

n) providing a cellular wireless jamming device responsive to a signal generated by the processor;

o) inputting information into the memory via the processor from hard-wired and wireless sources;

p) whereby said processor is enabled to compare the identification of cargo or persons within the vehicle as received from the first sensor to relevant data stored into memory with information such as a passenger or cargo manifest, and to identify expected, permitted, or disallowed passengers or cargo, and responsive to a mismatch, initiate the predetermined signal to activate the appropriate alarm, and additionally, enables selection of differing methods of telecommunication, and responsive to a predetermined alarm signal initiated from a sensor, to select or de-select a mode of communication to a remote location, and, in addition to the activate the cellular wireless jamming device.

A method for securing mass transit and mass transportation, according to the above including the step of providing infrared or night vision capable security cameras responsive to an input signal and providing an output of video feed information.

A method for securing mass transit and mass transportation, according to the above including the further step of communicating between the vehicle, vessel or craft and a remote location.

A method for securing mass transit and mass transportation, according to the above including the further step of communicating global positioning of the vehicle to a remote station.

A method for securing mass transit and mass transportation, according to the above including the further step of recording events sensed.

A method for securing mass transit and mass transportation, according to the above including the further steps of digitally viewing and recording the interior of the vehicle, and sending corresponding digital signals via a data and communications link to a remote station.

A method for securing mass transit and mass transportation, according to the above including the further step of programming the processor to conduct a self test program for checking safety equipments on board.

Other objects and advantages will become more evident from the following detailed description of a specific preferred embodiment of the invention when taken in conjunction with the appended drawings.

BRIEF DESCRIPTION OF THE DRAWINGS

FIG. 3*a* is the initial boot up sequence; FIG. 3*b* is the operating sequence.

DETAILED DESCRIPTION OF THE SPECIFIC PREFERRED EMBODIMENT

Figure 1:
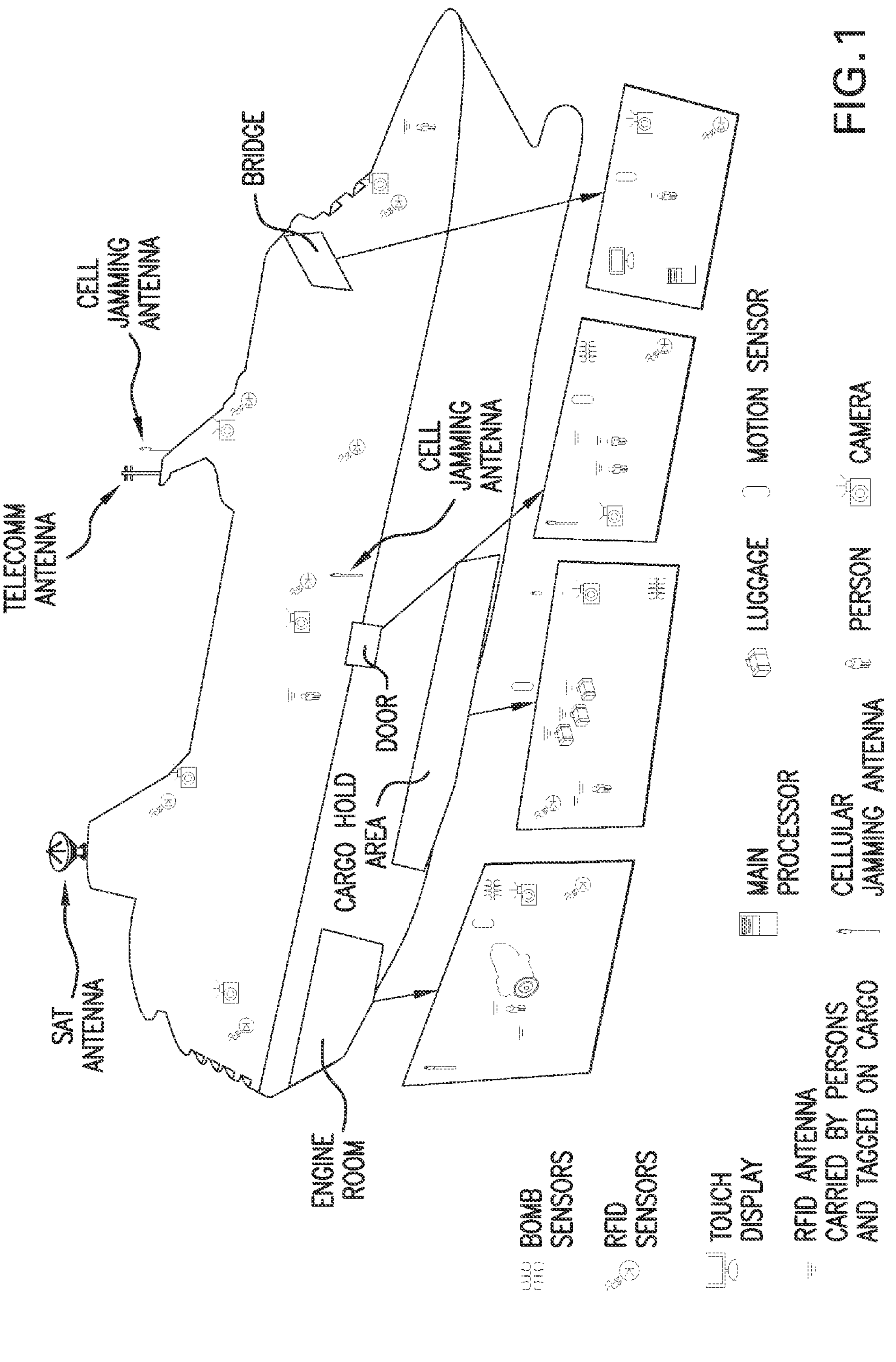
FIG. 1 is a side view of an example mass transit vehicle, in the form of an ocean-going ship partly broken away to show the interior and more particularly, to show a specific embodiment of the present invention.

As noted above, the present invention relates to a security system for mass transit, and more specifically, passenger and cargo trains, subways, cruise and cargo ships, buses, and commercial planes that are transporting large numbers of passengers or substantial cargo. Referring to FIG. 1, the system is shown in the specific form of a passenger ship and consists of a state-of-the-art vehicle 10 with its interior fitted with seats at various locations, and provided with exit/entry doors at various locations. The ship is outfitted with the following components. As shown, the ship has a satellite antenna 12, a telecomm antenna 14, and a cellular telephone jamming antenna 16. At the bottom of FIG. 1 is shown a legend 18 of the sensors illustrated on the ship. The various compartments in the ship are outfitted with sensors as shown in the panels 15*a-d* shown just below the ship with lead lines to the respective compartment associated with the panel. On the ship cross section itself various sensors are shown at various locations. The touch display 18*a* in panel 15*d* is the control panel of the system that the operator can use to monitor the system and to input or output information by touching the screen in manual selection of certain predetermined functions of the screen and/or system. Further, the vehicle is provided with emergency lights to indicate that an emergency exists and/or to direct persons to the nearest emergency exits or predetermined stations for disembarking.

The security system of the present invention, as shown in FIG. 1, further consists of sensors that are located in at least one cargo area, passenger area, engine compartment, and each doorway or entry and exit point, which have RFID sensors and biometric sensors in place. Persons and cargo items may be tagged or given unique RFID tags, such as one embedded into a card or perhaps affixed to object on or about itself, and is then individually identified by the RFID sensors 18*e* when in proximity of said sensor. Also biometric sensors 18*h* are employed at designated locations for controlled access. This information is transmitted to the microprocessor 33 of a computer 32, which is located on the bridge of the ship 10 as shown in panel 15*d*. Sensors and other components of the system may be hardwired to computer 32, but preferably are wirelessly coupled. Also, at any cargo hold, engine room or compartment, and at each doorway or entry and exit point there is fitted a motion sensing camera, thereby enables the electronic identification of RFID tagged items or persons to be simultaneously visually monitored, allowing a final check point whereby no item or person may pass entry/exit point without having the proper RFID tag on or about them. The cameras may be hardwired to the computer, but are preferably coupled using wireless connectivity. Motion detectors 18*b*, for example shown on panel 15*c*, are individually identified and fixed into position in these areas and others as shown, providing indication to any monitoring person that there is motion in that particular area. The motion detectors may be hardwired to the computer 32, but are preferable coupled using wireless connectivity. This will trigger the computer 32 to be alerted to the presence of movement in that respective area. The computer 32 shall then trigger the corresponding camera, see camera 18*c* for example on panel 15*b*, to begin transmitting video signal to the computer 32, and furthermore act as an alert to any monitoring person of the presence of movement about the area in addition to providing viewable video of that corresponding area.

In addition, the vehicle 10 is outfitted with an antenna 36 (14) to enable communication or radio communication with a central station (not shown), and which may be the depot from which the vehicle originated or an office of a designated first responder, or both. To this end, the computer 32 is coupled to a transmitter/receiver 38 to enable two-way communication and data feed with the central station. A GPS 39 with antenna 39*a* is associated with the transceiver 38 having an antenna 36 and a dedicated network antenna 40. A satellite transceiver 41 with antenna 43 is connected to the microprocessor 33 of the computer 32.

Figure 2:
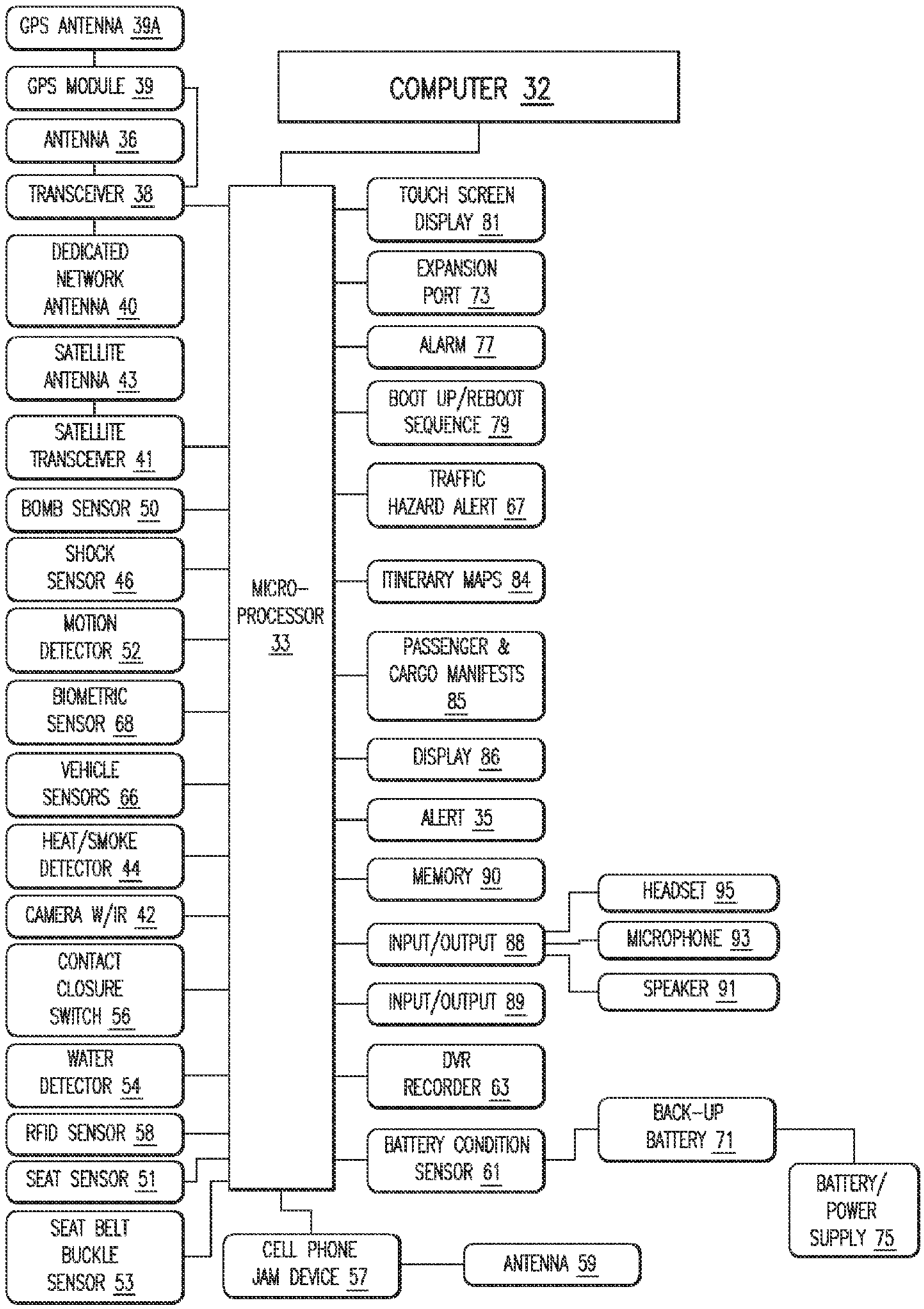
FIG. 2 is a schematic or block diagram showing the microprocessor of the main control unit of the system located in the ship and it's coupling, on one hand, to various sensors, and on the other hand, to various subsystems to effect certain functions.

Referring to FIG. 2, the computer 32 consists of a microprocessor 33, an input/output 89, a touch screen display 81 (18*a*) and a static display 86, and a memory 90. The microprocessor 33 of the computer, and its inputs and outputs are shown; the inputs to the microprocessor consist of a number of sensors which detect various conditions that warrant that a warning be announced or indicated. The sensors are all mounted in suitable places on the vehicle to give a warning of whatever condition is being sensed. These sensors include bomb detection sensors 50, which can detect radioactive and explosive materials in proximity to the sensor to give warning of such urgent condition, a combination smoke/heat detector 44 which is a sensor that senses smoke or excessive heat to sense and give a warning of a fire or other condition which produces smoke or heat, a water detector 54 to sense excess water, a shock sensor 46 to sense any excessive shock to the vehicle i.e. an explosion or collision impact, and give an appropriate indication, a battery condition sensor 61 to indicate the condition of the vehicle batteries 71 and 75, a motion detector 52 to give a warning of motion within the vehicle, a contact closure switch 56 on all doors to indicate the condition of the doors, an RFID sensor 58 to detect, identify and track any RFID tagged person or item, a biometric sensor 68 and the usual vehicle sensors 66 that are conventional on vehicles. Also there are a seat belt sensor 53 and a seat occupancy sensor 51. Manifests of cargo and/or passengers is downloaded from a predetermined remote location and stored 85, and then compared to actual manifest records, and responsive to a discrepancy, actuating an alert or alarm as indicated in FIGS. 5*s* and 5*b*.

Figure 3A:
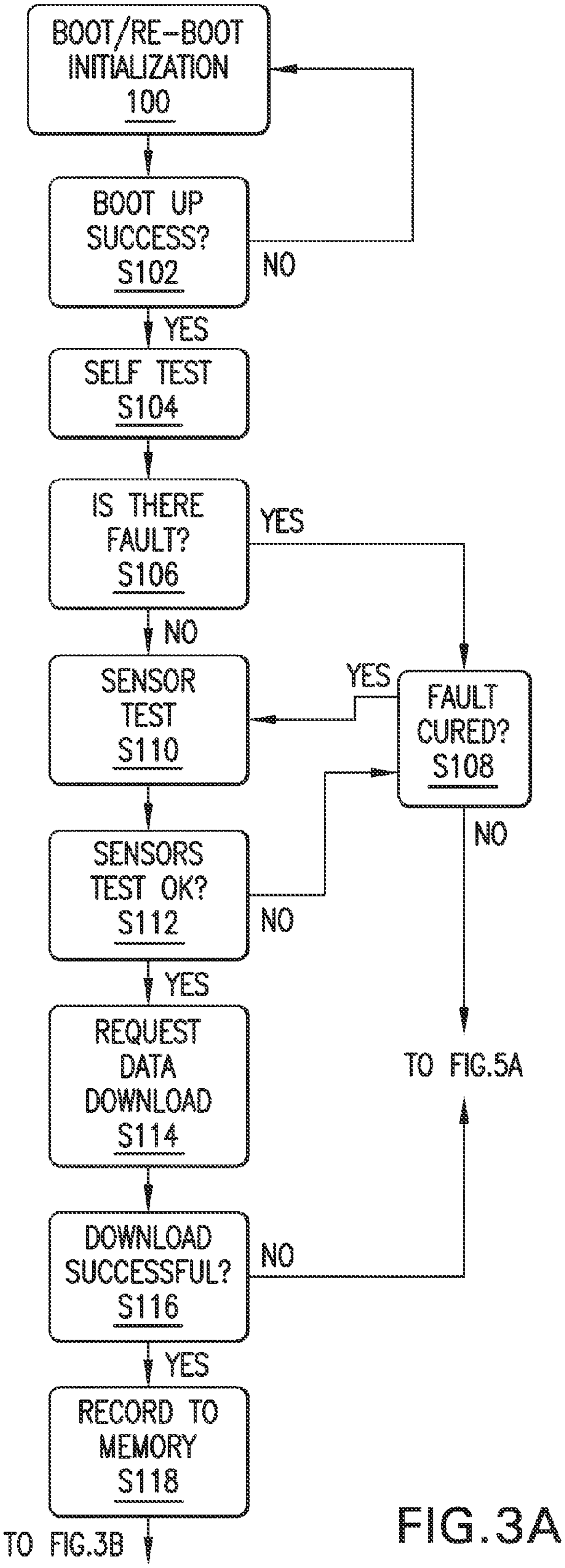
FIGS. 3*a* and 3*b* comprise a flow chart showing the main program that is run by the microprocessor.

The microprocessor 33 is also coupled to a communications transceiver 38 that, in turn, is also coupled to a GPS 39 with it's own antenna 39*a*, so that position can be broadcast via the transceiver. Antenna 36 and a dedicated network antenna 40 are connected to the transceiver 38. Similarly, a satellite transceiver 41, coupled to it's own antenna 43, is also connected to the microprocessor 33 thereby allowing at least 3 different methods of communication. A boot up/reboot sequence 79 is coupled to microprocessor 33, the flow chart of which is shown in FIG. 3*a* and is used to initiate the microprocessor, as well as, a logon function. Itinerary maps stored in block 84, and a display 86 and touch screen display 81 are coupled to the microprocessor. As previously noted, an input/output 88 including a headset 95, a microphone 93 and a speaker 91, of conventional design, are coupled to the microprocessor 33 together with a memory 90. Additionally, a cellular jamming device 57 with an associated dispersion antenna 59, is coupled to the microprocessor 33 and is capable, in response to a signal from the microprocessor 33, of jamming normal cellular telephone frequencies thereby disabling cellular signal or use within proximity of the vehicle. In order to assure proper servicing and expandability in order to avoid obsolescence, an expansion input/output port 73 is connected to microprocessor 33. A camera 42 is connected to microprocessor 33 and is capable of responding to a signal from the microprocessor, and further, able to record events to a DVR recorder 63, also connected to the microprocessor 33. A novel security system of the present invention is coupled to the microprocessor 33 so that any breach of the security system can be processed and appropriate audio and visual alarms can be initiated. In addition, the breach or violation of the security system can be broadcast to the central station The composition and function of the security system of the present invention will best understood if considered and explained in conjunction with the several operational conditions of the vehicle and the main program and subroutines as showing schematically in flow chart form in FIGS. 3-6. It will be understood that the hardware necessary for the practice of the present invention exists as state-of-the art and will be evident from the description of a preferred embodiment of the invention. Also, the invention will best be understood from the flow charts which describe the various functions of the invention, and from which, persons skilled in the art of computers will understand how to implement and carry out the invention as described. The programming of computers is highly developed, and persons skilled in the art will know intuitively, how to program the computer and microprocessor to obtain the effects of the present invention from the following description.

Consider as the initial condition of the vehicle that the vehicle 10 is stationary at rest and secured prior to activation, and with no one on board. This condition usually prevails when the vehicle 10 has been parked or docked overnight. At this time and condition, the microprocessor 33 is monitoring the various sensors to detect any explosives, persons, cargo, or motion. The arrangement of these sensors is well known in the art to those of ordinary skill, so a detailed explanation of their workings and locations is unnecessary to a full understanding of the invention. If any undesirable condition is detected while the vehicle 10 is unoccupied and at rest, the microprocessor 33 initiates a transmission via the transceiver 38 and antenna 36 to the central station (not shown) to give a warning of the detected condition whereupon appropriate action can be ordered and take place. Also, the vehicle battery is constantly being monitored, as the vehicle battery powers the security system. In the event of low battery, this condition is detected, and the microprocessor 33 initiates the switchover to the back-up battery 71 and alerts the central station via communication link in FIG. 6. If the security system is breached, or the vehicle starts in motion, or motion is detected inside the vehicle when it is supposed to be at rest, the microprocessor 33 initiates a transmission to the central station to give warning of the undesirable condition, as well as, to activate cameras, initiate recording of these events, and to provide an indication of location by means of the GPS.

Consider as the second condition of the vehicle the time when the vehicle is first entered by an operator. After gaining entry to the vehicle, the operator restarts the system, which then boots up and self-tests. The microprocessor provides the requisite signals for a read-out of the status of the system on the display and stores in memory the time the first person entered the vehicle, to the time the operator initiated the boot up sequence of the system. The color touch-screen of the display is illuminated, and the audio and video systems are tested to be sure they are operational. Then, a fault detection of all monitored areas to determine which are occupied (none should be occupied) and which areas if any detect alarm conditions (none should be indicative of any alarm condition). The display shows an arrangement of engine compartment, cargo area, chart of all passenger areas in the vehicle designed to simulate the actual arrangement, and all said areas are assigned a number or sector name. Assigned to each area or sector on the display is a red light and a green light. During the initial test, all red lights are turned on for a period of 5 seconds, then all green lights are turned on for a period of 5 seconds and then all lights are turned off. This enables a confirmation that the system and all indicator lights are functioning properly. All passenger areas show unoccupied except the system operator. Next the operator initiates a safety check of the vehicle to assure that systems are functioning properly. Finally, the cameras and video feeds are checked.

Any fault detected during the run-up to moving the vehicle is automatically stored in memory and the microprocessor initiates a transmission to the central station reporting the fault details. When everything is satisfactory, the operator initiates a transmission to the central station requesting the itinerary, manifest, or other such pertinent information. Alternatively, the central station, at a designated time of day or night, may have transmitted such details for the vehicle where it is stored in the block. In this case, the driver simply boots up the itinerary from that memory. The GPS system is integrated with the transceiver via a conventional telematics system. Accordingly, partitioned within the transceiver 38, a dedicated short-range communications link, or dedicated private network communication link, and/or a mobile cellular telephone link may be used.

Figure 3B:
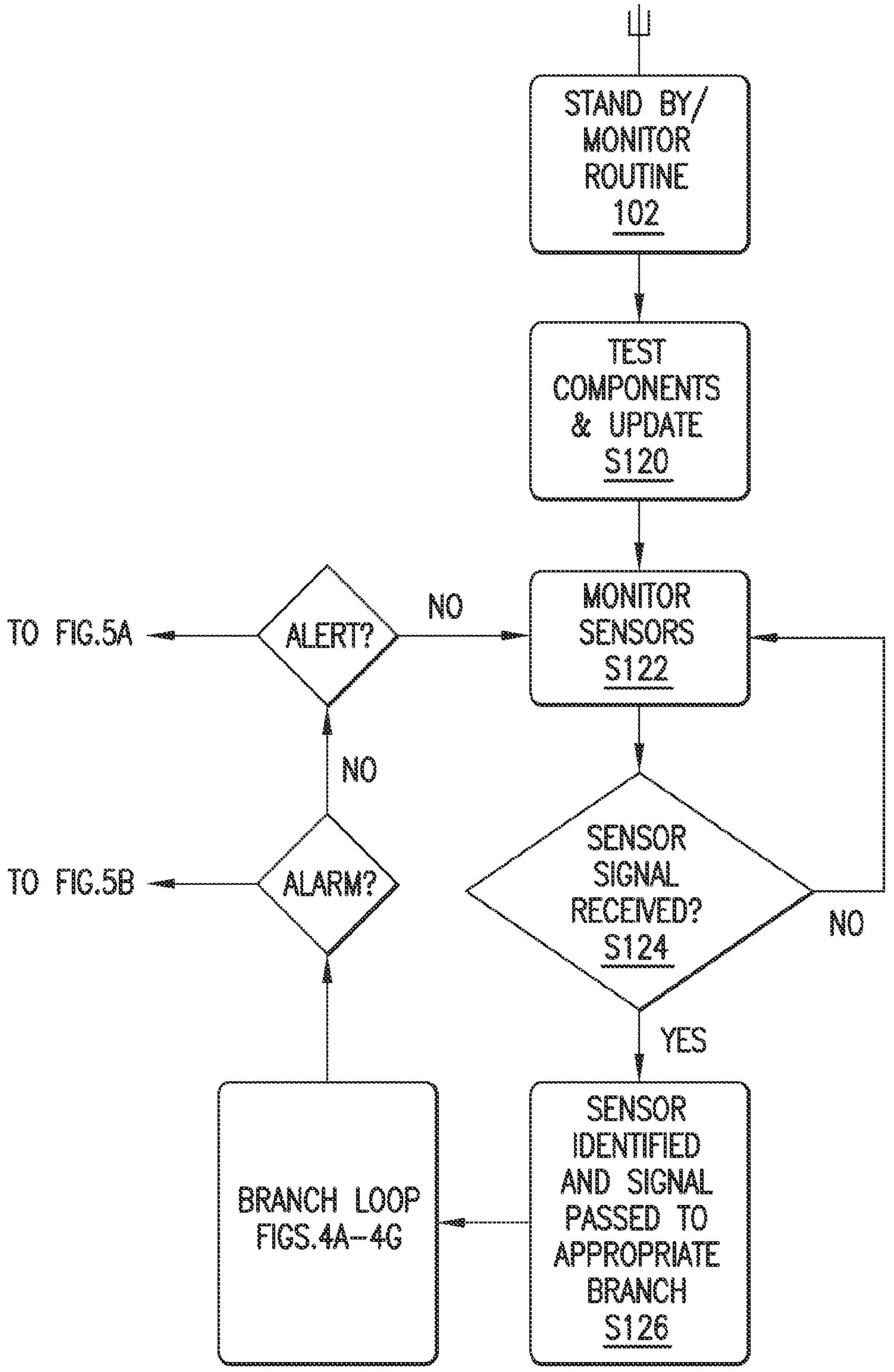

In more detail and with reference to the drawings, and more particularly, FIGS. 3*a* and 3*b*, the main program for the microprocessor is initialized in block 100. In Step 102, the system is checked to see whether the system has booted properly. If NO, then the system reverts to the block 100. If YES, the program the program moves to Step 104 where the system is self tested. If a fault is detected in step S106, the system is queried whether the fault has been corrected in step S108. If so, then the program moves to test each sensor individually in step S110. If the sensors test OK in step S112, then the program moves to step S114 to request data download. If the sensors test faulty, then the program moves to the fault cure step S108. Next it is determined in step S116 whether the download has been successful, and if so, the program moves to step S118 to record in memory, and then goes to block 102 in FIG. 3*b* for standby/monitoring routine.

In FIG. 3*b* following block 102, begins step S120 whereby the various components are continually and cyclically tested, and the system is further updated. The program now proceeds to step S122 where the sensors are continually and cyclically monitored. When a sensor is activated, a sensor signal is sent to the microprocessor, and this activity is carried out in step S124 which constantly checks for signal activation. If a signal is received, this is reported as YES and the program advances to step S126 where the sensor signal is identified, and the appropriate response is activated, i.e., the appropriate branch (FIGS. 4*a* to 4*g*) is initialized. The output of the branches is sent to a decision of ALARM?, which if YES, is sent to block 104 of FIG. 5*b*. If NO, the program passes to the decision of whether it is an ALERT?, which if YES, is sent to block 106 of FIG. 5*a*. If NO, the program returns to step S122.

Figure 4A:
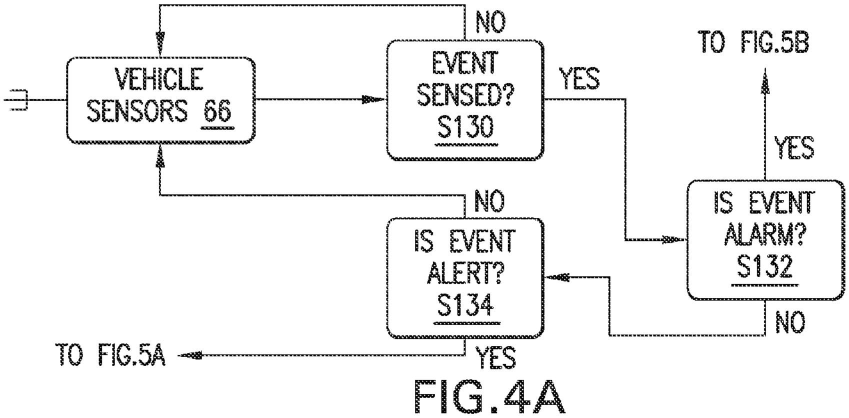
FIGS. 4*a*, 4*b*, 4*c*, 4*d*, 4*e*, 4*f*, and 4*g* show, respectively, the branched subroutines for the vehicle sensors, bomb sensors, RFID/biometric sensors, heat/water/smoke sensors, motion, contact closure, and seat/belt sensors.

The branch subroutine for vehicle sensors 66 is shown in FIG. 4*a*, and consists of the vehicle sensors in block 66 sensing an event in step S130, and if YES, the control of the program is passed to step S132 where it is determined if the event warrants an ALARM. If YES, then control passes to the subroutine of FIG. 5*b*. If NO, the program proceeds to step S134 where it is determined if an ALERT is warranted. If YES, control passes to the subroutine of FIG. 5*a*. If NO, the program goes back to sensing in block 66.

Figure 4B:
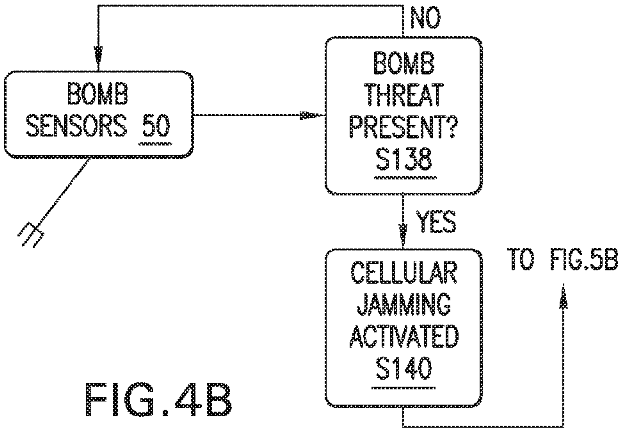

The branch subroutine for bomb sensors 50 is shown in FIG. 4*b*, and consists of bomb sensors capable of sensing whether a bomb threat is present in step S138, and if so, then activating cellular telephone jamming in step S140 and transferring control to block 104 of FIG. 5*b*. If NO, the program reverts back to the sensors 50.

Figure 4C:
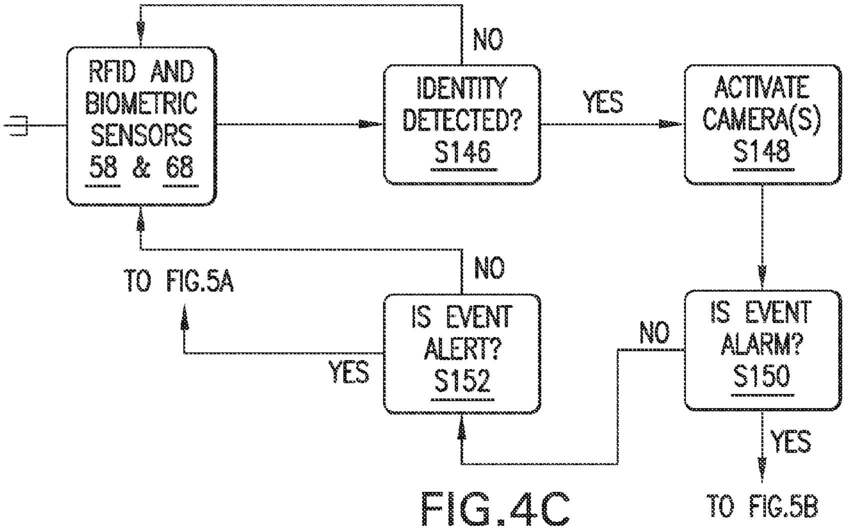

The branch subroutine for RFID 58 and biometric sensor 68, is shown in FIG. 4*c*, and consists of these sensors capable of sending and/or receiving pertinent information sufficient to detect the identification of the person, or item, having possession of related identification criteria, and this is contemplated as indicated in step S146. If a person is detected, the control passes to step S148 whereby a camera is activated to show the person detected. If an ALARM condition exists as determined in step S150, i.e. YES, control passes to the subroutine of FIG. 5*b*. If NO, the program proceeds to step S152 to determine if an ALERT is mandated. If YES, control passes to the subroutine of FIG. 5*a*. If NO, the program reverts back to the sensors 58 and 68.

Figure 4D:
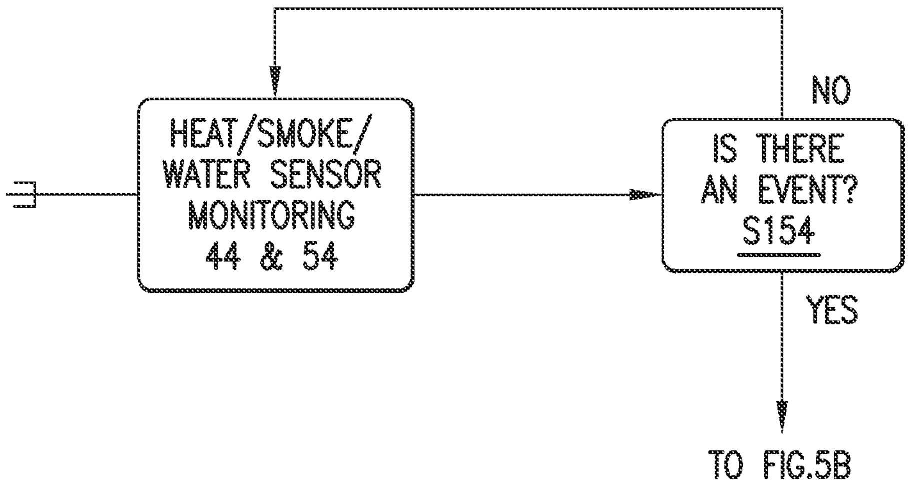

The branch subroutine for heat, smoke and water sensors 44 and 54 is shown in FIG. 4*d*, and consists of the sensors sending signals to query whether there has been an event in step S154. If YES, the control is passed to the subroutine of FIG. 5*b*. If NO, the program reverts to the sensors 44 and 54.

Figure 4E:
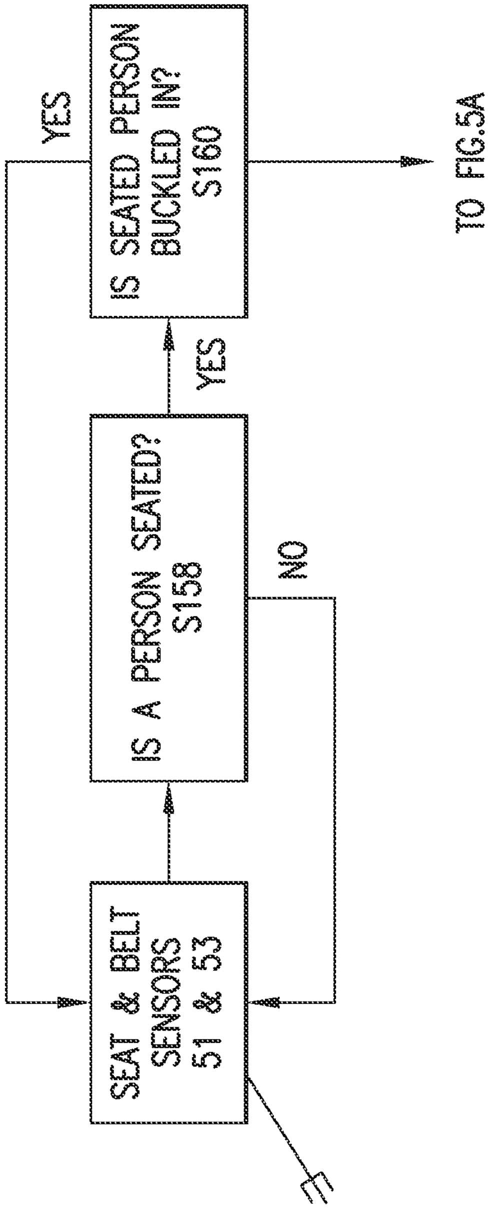

The branch subroutine for seat and belt sensors 51 and 53 is shown in FIG. 4*e*, and consists of the sensors sending signals to query in step S158 whether a person is seated. If NO, the program reverts back to the sensors 51 and 53. If YES, then control passes to step S160 to determine if the person is buckled in. If YES, then the program reverts back to the sensors 51 and 53. If NO, the control passes to the subroutine in FIG. 5*a*.

Figure 4F:
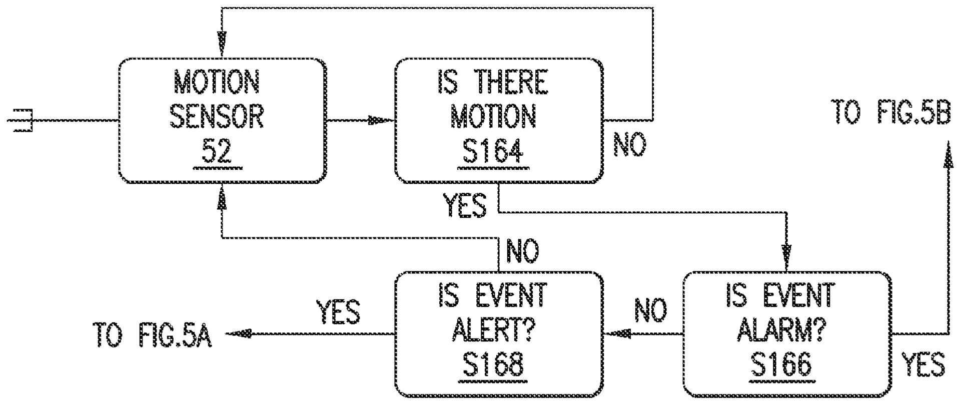

The branch subroutine for motion sensors 52 is shown in FIG. 4*f*, and consists of the sensors sending signals to query whether there is motion detected in step S164. If NO, the program reverts to the sensors 52. If YES, the program advances to step S166 to determine whether an ALARM is indicated, and if so, the control passes to the subroutine of FIG. 5*b*. If NO, the program advances to step S168 where it is determined whether an ALERT is indicated. If YES, the control passes to the subroutine of FIG. 5*a*. If NO, the program reverts back to the sensors 52.

Figure 4G:
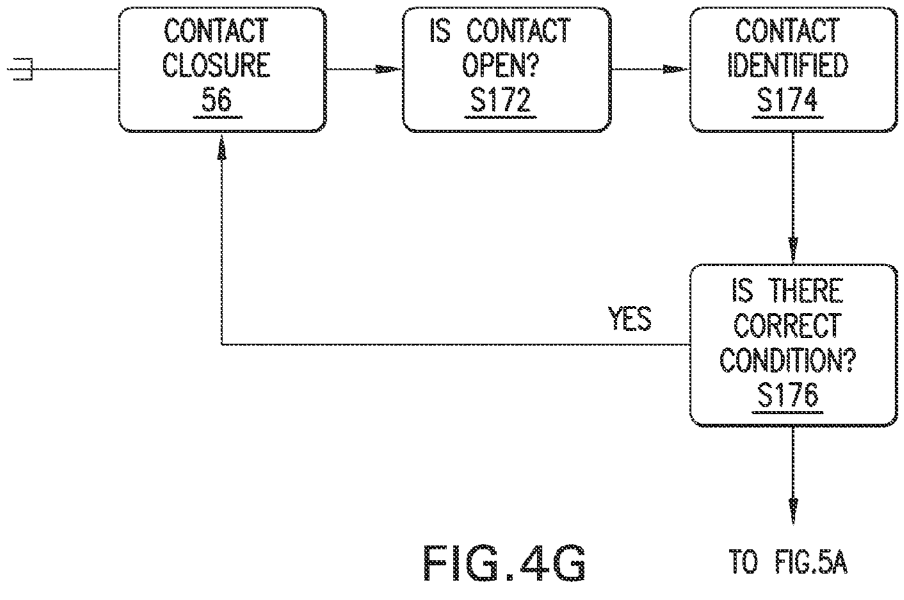

The branch subroutine for contact closure sensors (including actuators) 56 is shown in FIG. 4*g*, and consists of the sensors sending signals to step S172 where it is determined if the contact closure is open. The program then passes to step S174 where the contact closure is identified. Next the program passes to step S176 where it is determined if the contact closure is in the correct condition. If YES, the program reverts back to the sensors 56, and if NO, the program control passes to the subroutine in FIG. 5*a*.

Figure 5A:
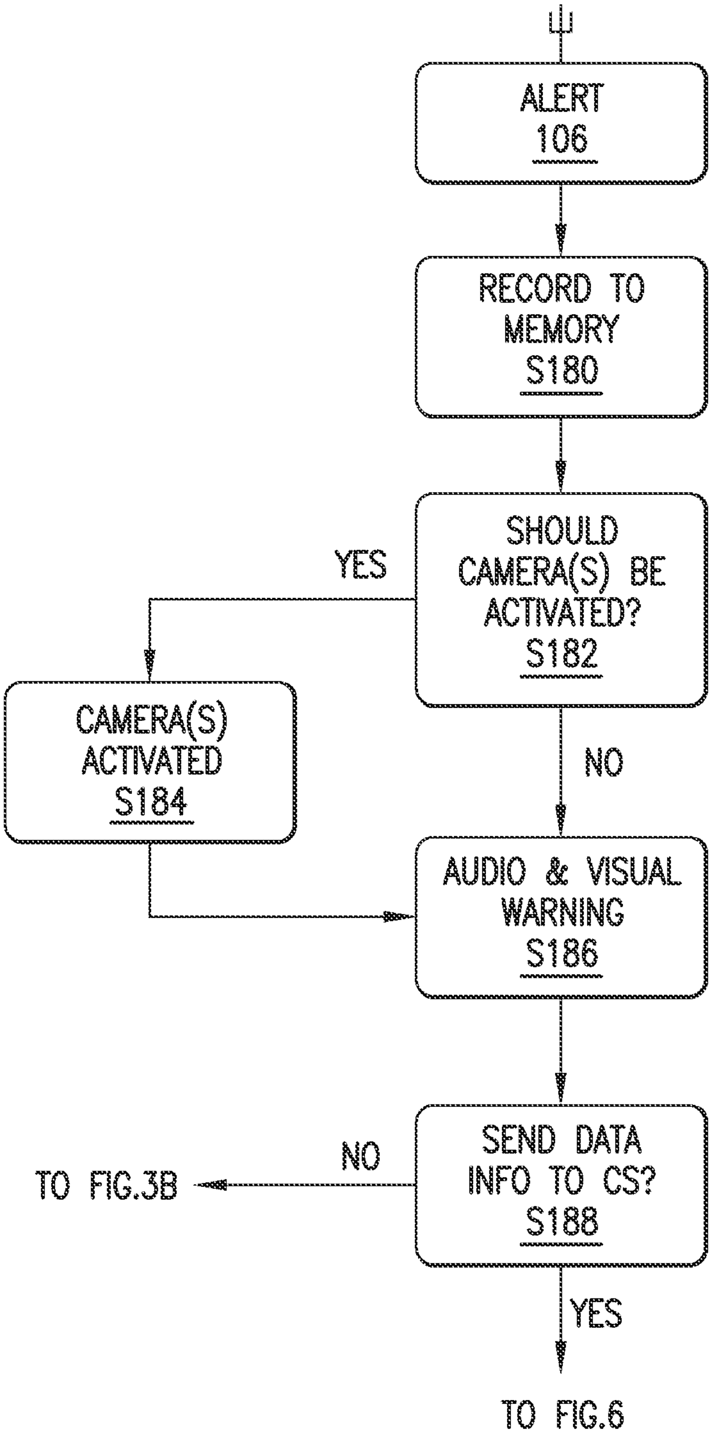
FIG. 5*a* is a flow chart showing the alert subroutine.
Figure 5B:
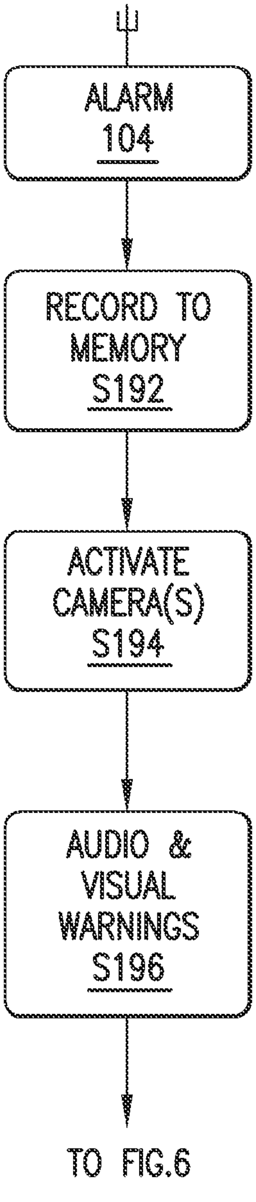
FIG. 5*b* is the alarm subroutine.

The ALERT subroutine is shown in FIG. 5*a*, and consists of the ALERT block 106 initiating step S180 for recording to memory, then to querying whether camera(s) should be activated in step S182. If YES, then the camera(s) are activated in step S184 and then the program returns to initiating the audio and visual warning in step S186. If NO, the program proceeds to step S186. Next the program proceeds to step S188 where data and information is sent to the central station as set forth in the communication subroutine of FIG. 6. If nothing is to be sent to the central station, the program reverts to the routine of FIG. 3*b*.

Figure 6:
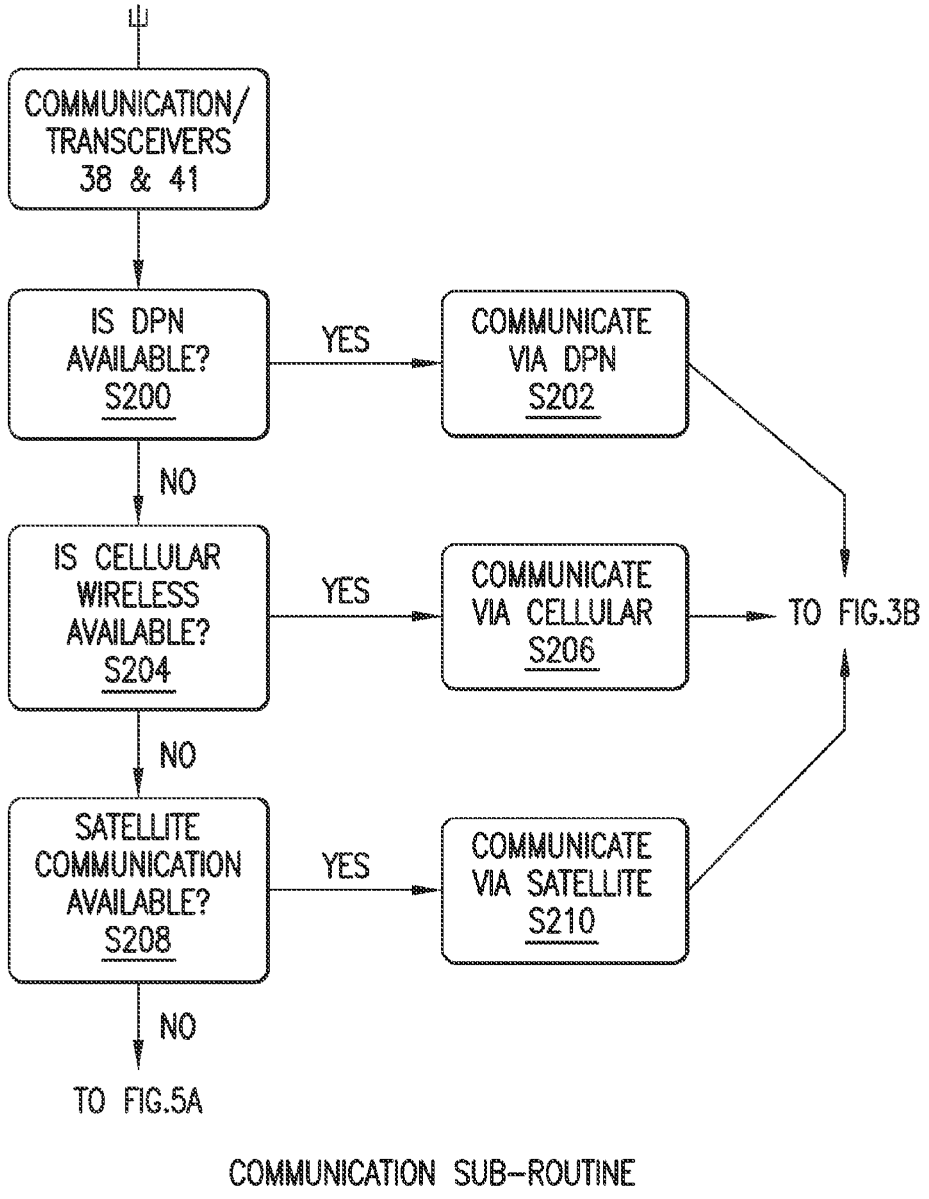
FIG. 6 is a flow chart showing the communications subroutine.

The ALARM subroutine is shown in FIG. 5*b* and consists of an alarm triggered in block 104 being recorded in memory in step S192, camera(s) being activated in step S194, audio and visual warnings being initiated in step S196, and the program control passing to the communication subroutine of FIG. 6.

The communication subroutine of FIG. 6 comprises the cellular transceiver and satellite transceiver, blocks 38 and 41 respectively, and then moving to step S200 where it is determined whether the Dedicated Private Network ("DPN") within block 38 is available. If YES, then communication is initiated through the DPN in step S202, and upon completion then returned to FIG. 3*b* as indicated in the diagram. If NO, a query is then initiated in step S204 where it is then determined if the cellular wireless network portion of block 38 is available. If YES, then communication is initiated in step S206, and upon completion, is then returned to FIG. 3*b* as indicated in the diagram. If NO, a query is then initiated in step S208 where it is then determined if the satellite transceiver block 41 is available. If YES, then communication is initiated in step S210, and upon completion, is then returned to FIG. 3*b* as indicated in the diagram. If NO, then the control is then passed to the ALERT subroutine of FIG. 5*a*, as indicated in the diagram.

The transceiver and communication link is provided with a no service alarm and indication. Every sixty seconds, the transceiver sends an operational signal to the central station. Also, the driver is provided with the capability of by-passing certain sensors in the case of a an non-threatening fault that is not immediately cured, or perhaps if they can determine a false passenger count. Further, all buttons, keyboard and display are localized in an integrated control panel, and preferably are integrated into a single touch screen, within easy access and reach of the driver, or a portable tablet w/ docking station. The seat belts are wound on reels spring loaded, as conventional, and stored in housings. In addition to the switch that signals the fastening and unfastening of the buckle, a second switch or sensor is provided that is actuated when the seat belt has been unreeled and withdrawn a predetermined distance from its housing to sense that the seat belt is actually wrapped around a passenger, and not bypassing the passenger by being buckled behind the passenger while he/she is sitting on the seat.

Although the invention has been described with respect to 15-second countdowns, it will be appreciated that an operator or other authorized person may be provided with the ability to override all delays. Further as previously noted, the data and communications link enables the central station to remotely monitor and update the system. To this end, whenever the central station wishes to update, first it sends a digitally secure inquiry to the vehicle to determine via the GPS the location and status of the vehicle. If the location and a secure positive identification status are received and accepted, the time and date and other data are transmitted to the vehicle and duly recorded in memory. This is usually done once a day but may be done at more frequent intervals. A further refinement of the invention concerns the use in the vehicle of seat belts that couple via a solenoid latching, that is a spring actuated latch holds the buckle together, but may be release through activation or deactivation of a solenoid, so that the buckles release. The solenoid can be manually overridden by releasing the buckle through the operation of a button or lever as is customary. The advantage of this arrangement is that in the event of an emergency such as a fire, explosion, or mandatory evacuation, it is possible for the operator or any other authorized person to press a button for 5 seconds and release all buckles. Also, in the event of a crash or submersion into water, the impact sensor 46 or water detector 54, respectively, will sense such a condition. In the case of impact, the release of the buckles occurs after a 10 second delay, or when motion of the vehicle ceases, as detected by an appropriate sensor. For sensing dangerous water level inside the cargo or passenger cabin, the buckles will release automatically when the water reaches a predetermined height in the bus. The digital camera, if off, is turned on if a sensor is activated.

Figure 7:
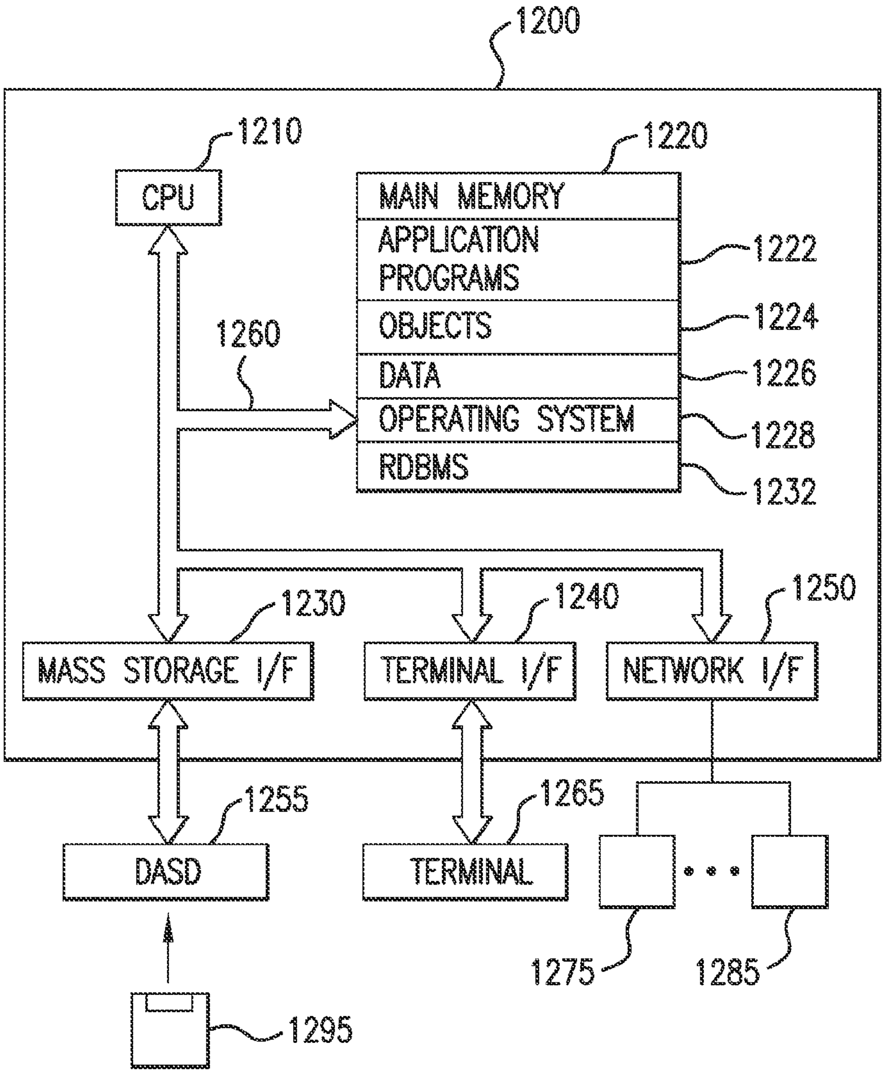
FIG. 7 shows a typical computer system for use with the present invention.

A block diagram depicting a computer system 1200, which is a processing circuit as used by an exemplary embodiment of the present invention is illustrated in FIG. 7. Processing circuits as understood in this specification include a broad range of processors, including any variety of processing circuit or computer system that is located at a single location, or distributed over several identifiable processors. These several processors can further be collocated or physically dispersed within a local area or a geographically widespread area. Any suitably configured processing system can also be used by embodiments of the present invention. The computer system 1200 has a processor 1210 that is connected to a main memory 1220, mass storage interface 1230, terminal interface 1240 and network interface 1250. A system bus 1260 interconnects these system components. Mass storage interface 1230 is used to connect mass storage devices, such as DASD device 1255, to the computer system 1200. One specific type of DASD device is a floppy disk drive, which may be used to store data to and read data from a floppy diskette 1295.

Main Memory 1220 contains application programs 1222, objects 1224, data 1226 and an operating system image 1228. Although illustrated as concurrently resident in main memory 1220, it is clear that the applications programs 1222, objects 1224, data 1226 and operating system 1228 are not required to be completely resident in the main memory 1220 at all times or even at the same time. Computer system 1200 utilizes conventional virtual addressing mechanisms to allow programs to behave as if they have access to a large, single storage entity, referred to herein as a computer system memory, instead of access to multiple, smaller storage entities such as main memory 1220 and DASD device 1255. Note that the term "computer system memory" is used herein to generically refer to the entire virtual memory of computer system 1200.

Operating system 1228 is a suitable multitasking operating system. Operating system 1228 includes a DASD management user interface program to manage access through the mass storage interface 1230. Embodiments of the present invention utilize architectures, such as an object oriented framework mechanism, that allows instructions of the components of operating system 1228 to be executed on any processor within computer 1200.

Although only one CPU 1202 is illustrated for computer 1202, computer systems with multiple CPUs can be used equally effectively. Embodiments of the present invention incorporate interfaces that each include separate, fully programmed microprocessors that are used to off-load processing from the CPU 1202. Terminal interface 1208 is used to directly connect one or more terminals 1218 to computer system 1200. These terminals 1218, which are able to be non-intelligent or fully programmable workstations, are used to allow system administrators and users to communicate with computer system 1200.

Network interface 1250 is used to connect other computer systems or group members, e.g., Station A 1275 and Station B 1285, to computer system 1200. The present invention works with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g. floppy disk 1295, CD ROM, or other form of recordable media, or via any type of electronic transmission mechanism.

Embodiments of the present invention include a Relational DataBase Management System (RDBMS) 1232. RDBMS 1232 is a suitable relational database manager, such as relational database managers that process versions of the Structure Query Language (SQL).

Embodiments of the invention can be implemented as a program product for use with a computer system such as, for example, the cluster computing environment shown in FIG. 7 and described herein. The program(s) defines functions of the embodiments (including the methods described herein) and can be contained on a variety of signal-bearing medium. Illustrative signal-bearing medium include, but are not limited to: (i) information permanently stored on non-writable storage medium (e.g., read-only memory devices within a computer such as CD-ROM disk readable by a CD-ROM drive); (ii) alterable information stored on writable storage medium (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It is also clear that given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.) It should be appreciated that the invention is not limited to the specific organization and allocation or program functionality described herein.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

Each computer system may include, inter alia, one or more computers and at least a signal bearing medium allowing a computer to read data, instructions, messages or message packets, and other signal bearing information from the signal bearing medium. The signal bearing medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the signal bearing medium may comprise signal bearing information in a transitory state medium such as a network link and/or a network interface, including a wired network or a wireless network, that allow a computer to read such signal bearing information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A security system for mass transit and mass transportation, wherein a substantial number of passengers and/or cargo items are typically transported, as in commercial vehicles or vessels such as aircraft, ships, trains, and subways, and comprising:

a) a processor or computer capable of: i) receiving input signals from a plurality of sensors and/or devices, ii) processing these input signals and collating the data therefrom; iii) outputting and reporting the collected and processed data; iv) outputting and indicating a plurality of on-board vehicle conditions; v) outputting collected and processed data for visual display;

b) a plurality of sensors on-board the vehicle or vessel capable of outputting signal to the processor;

c) an alarm actuated by the processor responsive to a signal and output via data signal and/or visual display, in order to warn of a predetermined alarm condition; and d) communication means for communicating directly or through another vehicle with other commercial vehicles or vessels free of any ground communication interaction, wherein the processor is programmable to receive signals from the plurality of sensors and collate said signals to differentiate between a threat condition in which the alarm is actuated and a non-threat condition in which an alert is provided, the processor further selecting and actuating communication to at least one appropriate and predetermined location, said appropriate and predetermined location including a location remote from the vehicle or vessel by selective means of communication as best available and appropriate to predetermined first responders, and wherein the communication means allows voice, data, video, and combinations thereof transfer.

2. A security system for mass transit and mass transportation, according to claim 1, wherein one of the plurality of sensors is a first sensor located on or within the vehicle or vessel, capable of sensing and outputting a first signal regarding the identity and presence of any identification media passing within detectable proximity of said first sensor.

3. A security system for mass transit and mass transportation, according to claim 1, wherein one of the plurality of sensors is a second sensor mounted on or within the vehicle or vessel for sensing and outputting a second signal indicative of biohazardous, explosive, or radioactive material located in the interior of the vehicle or in close outer proximity to the vehicle.

4. A security system for mass transit and mass transportation, according to claim 1, wherein the processor collates the biometric data and creates passenger and/or cargo manifest(s) which can be reported via output signal path by the processor.

5. A security system for mass transit and mass transportation, according to claim 1, wherein one of the plurality of sensors is a motion sensor for providing an output signal indicating motion within the associated area, in or around the vehicle or vessel.

6. A security system for mass transit and mass transportation, according to claim 1, further including camera(s) capable of outputting a signal and receiving a signal, and said camera being coupled to the processor, in order to provide visual monitoring of the coverage area when an associated sensor or the processor has output a predetermined signal to said camera.

7. A security system for mass transit and mass transportation, according to claim 6, further including a video signal that is output by said camera(s) and displayed on a device within the vehicle or vessel that is also coupled to the processor, or that is output to predetermined signal path for visual monitoring external to the vehicle or vessel, to provide visual monitoring of the associated area(s).

8. A security system for mass transit and mass transportation, according to claim 6, wherein an associated camera is responsive to the output of a signal from the processor or from other signal within the vehicle or vessel.

9. A security system for mass transit and mass transportation, according to claim 1 wherein memory is utilized for storage and retrieval of data received or processed by the processor.

10. A security system for mass transit and mass transportation, according to claim 1 wherein the communication means includes a transceiver or communication device coupled to the processor, enabling data communication via Dedicated Short Range Network (DSRC).

11. A security system for mass transit and mass transportation, according to claim 1 wherein the communication means includes a transceiver or communication device coupled to the processor, enabling communication via satellite link.

12. A security system for mass transit and mass transportation, according to claim 1 further including a global positioning system (GPS) also coupled to the processor in order to provide location and other such related data associated with the capabilities of said GPS.

13. A security system for mass transit and mass transportation, according to claim 12 further including telematics capability wherein vehicle or vessel motion, direction, speed, and other such information may be collected and processed by the processor.

14. A security system for mass transit and mass transportation, according to claim 1 further including vehicle or vessel route itinerary that can be received remotely and/or input or modified by input to the processor from within the vehicle.

15. A security system for mass transit and mass transportation, according to claim 1 wherein a digital recording device coupled with the processor can record data and video for storage and playback.

16. A security system for mass transit and mass transportation, according to claim 1 further including digital cameras for viewing interior and exterior areas of the vehicle or vessel for recording and/or remote monitoring.

17. A security system for mass transit and mass transportation, according to claim 1 further including means for conducting processor controlled power-up and self-test programming of the processor and coupled sensors and devices.

18. A security system for mass transit and mass transportation according to claim 1, further including at least three modes of communication, the at least three modes of communication including i) a wireless dedicated short range communication network, ii) a conventional cellular wireless protocol, and iii) a satellite transceiver for satellite based telecommunication outside modes i) and ii), wherein the processor enables selection of differing modes of communication, and responsive to a predetermined alarm signal initiated from a sensor, to select or de-select a mode of communication to a remote location.

19. A security system for mass transit and mass transportation, according to claim 1, further including a transmitter for transmitting a signal or beacon that includes a unique vehicle or vessel identifier.

20. A security system for mass transit and mass transportation, wherein a substantial number of passengers and/or cargo items are typically transported, as in commercial vehicles or vessels such as aircraft, ships, trains, and subways, and comprising:

a) a processor or computer capable of: i) receiving input signals from a plurality of sensors and/or devices, ii) processing these input signals and collating the data therefrom; iii) outputting and reporting the collected and processed data; iv) outputting and indicating a plurality of on-board vehicle conditions; v) outputting collected and processed data for visual display;

b) a plurality of sensors on-board the vehicle or vessel capable of outputting signal to the processor;

c) an alarm actuated by the processor responsive to a signal and output via data signal and/or visual display, in order to warn of a predetermined alarm condition, wherein the processor is programmable to receive signals from the plurality of sensors and collate said signals to differentiate between a threat condition in which the alarm is actuated and a non-threat condition in which an alert is provided, the processor further selecting and actuating communication to at least one appropriate and predetermined location, said appropriate and predetermined location including a location remote from the vehicle or vessel by selective means of communication as best available and appropriate to predetermined first responders, and wherein the system provides remote access such that monitoring and control of certain functionalities of the vehicle or vessel can be received and/or input or modified by input to the processor.

21. A security system for mass transit and mass transportation, according to claim 1 wherein the vehicle or vessel is linked to other predetermined network vehicles.

22. A security system for mass transit and mass transportation, according to claim 21 wherein, the vehicle or vessel is a node on the network.

23. A security system for mass transit and mass transportation, according to claim 1, wherein the security system is accessible via the internet.

24. A security system for mass transit and mass transportation, according to claim 23, wherein the internet access is a secured internet connection.

25. A security system for mass transit and mass transportation, according to claim 12 further including a traffic hazard warning to alert of certain traffic hazards in the path of the vehicle or vessel.

26. A security system for mass transit and mass transportation, according to claim 25 wherein the traffic hazard warning feature receives a predetermined output signal from an external source and at least one of audio and visual warnings are activated to alert the vehicle or vessel of a potentially unsafe condition.

* * * * *